United States Patent [19]

Diederen et al.

[11] Patent Number: 4,459,148

[45] Date of Patent: Jul. 10, 1984

[54] ROLL FOR CARRYING GLASS SHEETS

[75] Inventors: Werner Diederen; Heinz Ueberwolf, both of Herzogenrath; Heinz G. Zilgens, Uebach Palenberg; Mario Roth, Aachen, all of Fed. Rep. of Germany

[73] Assignee: Saint-Gobain Vitrage, France

[21] Appl. No.: 396,713

[22] Filed: Jul. 9, 1982

[30] Foreign Application Priority Data

Jul. 15, 1981 [FR] France ................... 81 13805

[51] Int. Cl.³ .................. C03B 35/18; B21B 27/00
[52] U.S. Cl. ........................... 65/348; 29/132; 65/181; 65/193; 65/253; 65/374.11; 65/374.13
[58] Field of Search ................. 65/181, 348, 193, 253, 65/374.11, 374.13; 29/132

[56] References Cited

U.S. PATENT DOCUMENTS

| | | | |
|---|---|---|---|
| 2,120,435 | 6/1938 | Desbordes et al. | |
| 2,495,578 | 1/1950 | Fallon | 263/6 |
| 3,763,533 | 10/1973 | Blom et al. | 29/162 |
| 3,804,701 | 4/1974 | Bognar | 161/165 |
| 3,853,525 | 12/1974 | Gorman | 65/374.13 |
| 3,954,556 | 5/1976 | Jackson et al. | 162/145 |

FOREIGN PATENT DOCUMENTS

| | | |
|---|---|---|
| 1596369 | 1/1980 | Fed. Rep. of Germany . |
| 2832125 | 1/1980 | Fed. Rep. of Germany . |
| 2135122 | 12/1972 | France . |
| 47714 | 4/1979 | Japan ............... 65/374.13 |
| 1078878 | 8/1967 | United Kingdom . |

Primary Examiner—Arthur D. Kellogg
Attorney, Agent, or Firm—Pennie & Edmonds

[57] ABSTRACT

A roll (4) for conveying sheets of glass at a heat-tempering temperature horizontally through a heat-tempering furnace enclosure includes a core (10) of refractory metal and a shell (20). The shell (20) is formed of a refractory material composed of a calcium silicate base agglomerate having a specific mass of from 200 to 800 kg/m³.

13 Claims, 1 Drawing Figure

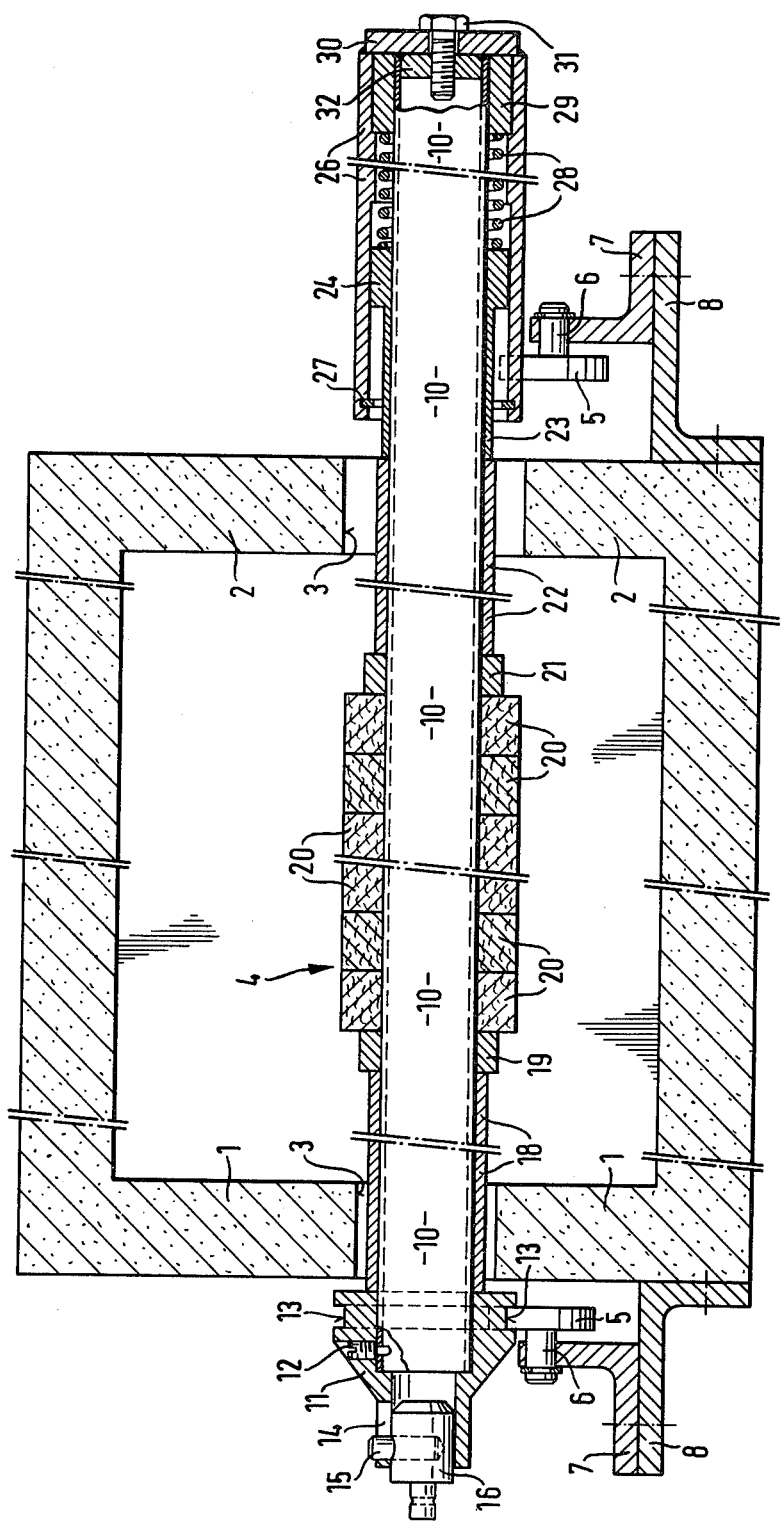

ROLL FOR CARRYING GLASS SHEETS

DESCRIPTION

1. Technical Field

The invention relates to a roll for conveying sheets of glass within an enclosure of a glass manfacturing operation. The roll is located for conveying the glass sheets horizontally and comprises a tubular metal core and a shell of refractory material for conveying the glass sheet which has been heated to a heat-tempering temperature of about 630° C.

2. Background Art

A roll for conveying sheets of glass heated to a heat-tempering temperature of about 630° C., and thus possibly subjected to a significantly higher temperature of about 850° to 900° C. within the enclosure, must meet certain standards. For example, and quite possibly the most important of these standards, the roll must not damage the surface of the sheet softened at the heat-tempering temperature. Further, the shell of the roll must not display any tendency of adhering to the surface of the sheet thereby to cause resultant damage. In addition, the shell of the roll must be formed of a material to withstand the high temperature experienced within the enclosure and it must have good wearability thereby to obviate frequent change.

The known prior art, by and large, fails to meet these standards. To this end, one prior art teaching obtained from German Auslegeschrift No. 15 96 369 is that of a roll comprising a quartz tube and a coating of a fabric either of glass or silica fibers. It has been found that the wear characteristics of the coating material when subjected to temperature conditions in the conveying of softened glass through a heat-tempering enclosure is poor, requiring frequent change. The coating material is expensive; its replacement normally requires the downtime of the operation, adding further expense to total cost of fabrication, and it has also been found not uncommon that the quartz tube of extremely brittle nature will suffer damage during the replacement operation.

U.S. Pat. No. 2,120,435 describes another prior art teaching which, likewise, is considered to fail in attaining the prescribed standards. According to the patent, a succession or series of rings of compressible asbestos material are located on a hollow metal shaft. A ring is disposed at each end of the series of asbestos rings and, yet a pair of additional rings are secured at the respective ends of the metal shaft thereby to compress the interposed rings into contact with the asbestos rings.

The wear characteristics of the asbestos rings, under the conditions of operation to which they need be subjected, are poor. To this end, asbestos dehydrates at high temperature, such as temperatures in the range of 850° C. and may crumble into a powder. The roll of the patent, therefore, cannot be used in the environment of a heat-tempering furnace in the horizontal conveyance of sheets of heated glass.

SUMMARY OF THE INVENTION

It is a primary aspect of the present invention to provide a roll for conveying sheets of glass heated to a heat-tempering temperature of about 630° C. and particularly a roll for this purpose that is capable of attainment of the standards previously mentioned, and possible others, in the conveyance, horizontally, of a sheet of softened glass through a heat-tempering furnace. Thus, the roll of the invention includes a shell of a refractory material which is sufficiently soft not to run the risk of damaging the surface of the sheet. The roll will not adhere to the surface of the sheet at high temperature, and it displays the characteristic of wearability which exceeds that of known rolls in the prior art.

The shell is formed of a refractory material preferably of a calcium silicate base agglomerated material having a specific mass of from about 200 to 800 kg/m$^3$. Most advantageously the refractory material will be a practically dehydrated calcium silicate.

The theoretical specific mass of calcium silicate is on the order of 2900 kg/m$^3$, a specific mass that far exceeds that of the unique refractory material described herein. The calcium silicate base agglomerate having much less density lends itself particularly well to the use in fabrication of a shell of a roll for conveying sheets of glass heated to a heat-tempering temperature. It has been found that wear of the material is surprisingly slight under the conditions of operation in a heat tempering furnace. To this end, the shell has demonstrated a working life about ten times longer than a coating of the type described in the German publication.

Further, it has been found that even with rolls that do not rotate in a completely true manner, the wear in the material is within regions furthest away from the axis of rotation which has the result advantageously of making the supporting surface true.

The reduced density of the material is believed to play a large role in the attainment of the desired standards of operation. To this end, particulate material or grains of impurities detach rapidly by friction and easily fall off rather than becoming encrusted on the surface of the shell. Particles of calcium silicate itself, having a hardness less than that of glass, will not ordinarily damage or otherwise score the surface of the glass.

Various calcium silicates may be used, although it is important that a large part, at least of the agglomerate, comprise dehydrated calcium silicate. Compositions comprising a major part of wollastonite, and also a relatively large proportion of amorphous or partially crystallised calcium silicate in a variable degree provide very good results. Amorphous or partially crystallized forms appear when the calcium silicate is worked by reaction of calcium compounds and sodium silicate or sodium metasilicate.

Because of the reduced density of the refractory material, the bond between particles and grains that form the agglomerate comprise an important consideration. The bond may be enhanced by the addition of a variable proportion of organic or inorganic fibers and, as may be necessary, the addition of organic or inorganic products which act as a binder.

The refractory material may be fabricated in a liquid phase, that is, by precipitation, and the additions may be introduced to the precipitate. In addition to their role in bonding, the additives also enhance the strength characteristics of the refractory material. It may be taken into account that the binders and organic fibers are destroyed or burn at temperatures to which the shell is subjected. Thus, it may be taken into account the bond of the grains of the agglomerate may fritter on the contact surface, and the frittering may increase as the first binders disappear.

Particularly, favorable operation of the shell of the roll is achieved with a refractory material containing 20 to 75% wollastonite, crystallized either in needles or fibers of a length up to 1 mm, 75 to 20% calcium silicate, particularly powdered wollastonite in granular form with a diameter of particles of no more than a few microns and a slight amount of calcium carbonate, quartz powder and organic fibers.

BRIEF DESCRIPTION OF THE DRAWING

The FIGURE is a vertical section of the roll of the invention in the environment within an enclosure of a glass manufacturing operation.

BEST MODE FOR CARRYING OUT THE INVENTION

The FIGURE illustrates schematically a heat-tempering furnace formed by an enclosure 2. A plurality of heating devices (not shown), such as radiant electric elements are located within the enclosure at appropriate disposition for heating a glass sheet (not shown) to a heat-tempering temperature of about 630° C. Under these conditions it is not uncommon that a conveyor including a plurality of rolls within the furnace for conveying the glass sheets will reach a temperature significantly higher, for example, a temperature in the range of about 850° C., and possibly 900° C.

A roll 4 is formed by a core 10 and a shell 20. The roll comprises one of several like rolls of the conveyor located with the enclosure for conveying the glass sheets through a high temperature zone. Core 10 preferably is formed of refractory steel, and the shell is formed of a calcium silicate base agglomerate, to be described more particularly below.

Enclosure 2 includes a pair side walls 1 which, together with its other walls, are formed of a refractory material as conventionally used in a furnace for heat-tempering glass sheets. A plurality of openings 3 are located in each of the side walls, in opposed, spaced-apart relation, and individual rolls are positioned to extend through the paired openings.

A pair of idler rolls 5 is located adjacent each side wall, outside of the enclosure. An axle 6 for mounting each idler roll of each pair is supported by an angle iron 7 which in turn, is supported by frame 8. The frame, additionally, supports the enclosure 2. Each idler roll 5 is capable of rotation, either with the axle or relative to the axle upon which it is mounted. Thus, rotational movement of roll 4, as will be discussed will result in a following rotational movement of the idler rolls of each pair providing a rotational rather than a stationary, sliding support for opposite ends of the roll in a substantially V-shaped trough.

A sleeve 11 is telescopically received on one end of core 10. The sleeve includes a pair of cylindrical surface regions and a conical region there between. A groove 13 is formed in the cylindrical region superposed along the length of core 10. The groove provides a track for one pair of idler rolls 5, and serves both to locate the core axially and take-up lengthwise stress to which roll 4 may be subjected.

The roll 4 is driven in rotary movement by a drive motor (not shown). A pin 16 at the output of the drive motor is telescopically received within an opening in the other cylindrical region. A lug 15 carried by pin 16 is received into a slot 14 extending from the end of the last-mentioned cylindrical region, and a screw 12 received through both the sleeve 11 and core 10 couples the sleeve to the core. The drive motor may drive the roll 4 positively at any desired rotational speed of movement.

Each of the other rolls are adapted to be similarly driven.

Shell 20 includes a plurality of cylindrical rings which are disposed in side-by-side relation axially along core 10, and substantially within a mid-region between side walls 1 of enclosure 2. Each ring may be of a thickness of from 20 to 100 mm, and the diameter of the rings may range from 25 to 100 mm. As indicated, the rings are formed of a calcium silicate base agglomerate and may be cut from a plate with standard tools. The thickness of the rings, thus, is dependent upon the plates used, and the diameter of the rings is dependent upon use.

A tube 26 comprising a spring housing is received about the other end of core 10. The inner surface of the tube is spaced somewhat from the outer surface of core 10 and the outer surface of the tube is substantially coaxial with that of the surface of groove 13. The coaxial relationship of the outer surface of the tube which acts as a bearing on the idler rolls 5 and the surface of the groove maintains roll 4 in a horizontal attitude for conveying the glass sheets horizontally through the high temperature zone.

All rolls of the conveyor may be similarly mounted.

A brace 18, 22 and a disk 19, 21 are disposed along core 10 on opposite sides of the rings of sheet 20. Particularly, the brace 18 extends between sleeve 11 and disk 19, juxtaposed the left end (see the FIGURE) of the shell, and brace 22 extends in the other direction from disk 21, juxtaposed the right end of the shell. The braces and disks maintain the shell substantially midway between side walls 1 of enclosure 2.

Each of the braces 18, 22 and disks 19, 21 include a cylindrical bore for sliding receipt on core 10. A bushing 23 is likewise received on the core. The bushing includes a sleeve portion and a flange 24 having an outer surface for sliding engagement within tube 26.

Bushing 23 is compressively loaded within tube 26 whereby its sleeve portion, moved to a position juxtaposed brace 22 likewise, compressively loading the structure positioning shell 20 on core 10 within the enclosure.

The outer end of the tube 26 may be counter bored slightly and a bushing 29 is received within the tube adjacent a shoulder formed therein. A washer 32 is welded or otherwise secured at the end of core 10, and a tip 30 is mechanically secured to the washer by means of a bolt 31, or similar structure. The tip closes the outer end of tube 26 and supports the bushing 29 within the counterbore. Finally, the loading force on the shell is developed by a compression spring 26 which acts between the flange 24 of bushing 23 and bushing 29. A clip 27 is supported within tube 26 at its inner end to prevent sliding movement of bushing 23 out of the tube.

The compression assembly and compressive loading of the structure makes it possible to absorb variation in expansion between core 10 and sheet 20, as well as to overcome shrinkage which may be undergone by the rings of the shell as a result of fire loss so that the rings always are in a tight, surface-to-surface contact. The tube 26, forming a spring housing, is not subjected to the high temperature within the enclosure and its operation is not compromised by heat.

While the invention has been described as utilizing a shell 20 including a plurality of rings in surface-to surface contact, it is contemplated that the shell may comprise a single ring, and it is contemplated that the individual rings of the shell may be spaced apart by interposed braces, as the braces previously discussed.

The calcium silicate base agglomerate for forming the shell may be composed in accordance with the examples set out below.

EXAMPLE I

| Constituent | Percentage |
| --- | --- |
| Wollastonite | 50% |
| Calcium silicate | 40% |
| Quartz | 5% |
| Calcium carbonate | 3% |
| Organic fiber | 2% |

The wollastonite preferably is crystallized in needles of less than 1 mm in length, and the calcium silicate and quartz are in powdered form. The elaboration of the composition leads to a specific mass on the order of 400 kg/m$^3$.

EXAMPLE II

| Constituent | Percentage |
| --- | --- |
| Wollastonite (powdered) | 66.5% |
| Wollastonite (needle) | 20% |
| Quartz (needle) | 8% |
| Calcium carbonate | 3.5% |
| Fibers (cellulose) | 2% |

The relatively high fine grain powdered wollastonite content renders this composition with a specific mass on the order of 670 kg/m$^3$.

EXAMPLE III

| Constituent | Percentage |
| --- | --- |
| Wollastonite (powdered) | 60% |
| Wollastonite (needle) | 30% |
| Quartz (powdered) | 3% |
| Calcium carbonate | 3% |
| Fibers (cellulose) | 4% |

The composition has a specific mass on the order of 650 kg/m$^3$.

The rings of shell 20 having a thickness of 50 mm, available in the market under the mark "Promasil 1100", have been used in practicing the present invention. "Promasil 1100" is a calcium silicate base material having a specific mass on the order of 400 kg/m$^3$. The material meets the standards heretofore described under the conditions set out, and, in fact, after 48 hours stay at 800° C., the fire loss was only about 8%. Thus, the specific mass had dropped only to about 370 kg/m$^3$. "Promasil 1100" is a trademark of Promat Gesellschaft fuer moderne Baustoffe mbH and Co. KG.

Another material is available in the market under the mark tradename "Salue-200/800" (or "Salue-200/1000"). The specific mass is on the order of 240 to 260 kg/m$^3$. "Salue" is a trademark of Saline Lueneburg and Chemische Fabrik GmbH.

We claim:

1. A roll for conveying sheets of glass heated to a heat-tempering temperature horizontally through an enclosure wherein the temperature may attain about 900° C., said roll including a core of refractory metal and a shell defined by at least one ring surrounding said core, said shell being formed of a calcium silicate base agglomerate refractory material, free of asbestos, bound mainly by agglomeration and having an apparent specific mass of from 200 to 800 kg/m$^3$.

2. The roll of claim 1 wherein said material is substantially dehydrated.

3. The roll of claim 1 or 2 wherein the apparent specific mass of said material is about 400 kg/m$^3$.

4. The roll of claim 1 or 2 wherein said material has the composition, by weight percentage, as follows:
   (a) 20 to 75% wollastonite;
   (b) 75 to 20% powdered calcium silicate;
   (c) 0 to 10% organic binder; and
   (d) 0 to 10% organic or inorganic fiber.

5. The roll of claim 4 wherein said wollastonite is in the form of needles having a length of about 1 mm, and wherein the powdered calcium silicate has a granular size not to exceed a few microns.

6. The roll of claim 5 wherein said wollastonite is present in an amount of 50%, said calcium silicate is present in an amount of 40%, and wherein said organic binder and either organic or inorganic fiber includes:
   (a) 5% fine grain quartz powder;
   (b) 3% calcium carbonate; and
   (c) 2% mineral fiber.

7. The roll of claim 1 wherein said shell includes a plurality of rings supported by said core.

8. The roll of claim 1 wherein said shell includes a tube supported by said core.

9. The roll of claim 7 wherein said rings are disposed axially along said core in surface-to surface contact.

10. In combination
    (a) an enclosure of a heat-tempering furnace, said furnace capable of attaining a temperature of about 900° C.;
    (b) a conveyor for conveying sheets of glass heated to a heat-tempering temperature horizontally through said enclosure, said conveyor comprising a plurality of rolls extending through opposed walls of said enclosure, and each said roll comprising
        (1) a core of refractory metal, and
        (2) a shell defined by at least one ring surrounding said core, said shell being formed of a calcium silicate base agglomerate refractory material, free of asbestos bound mainly by agglomeration and having an apparent specific mass of from 200 to 800 kg/m$^3$; and
    (c) means subjecting said shell to a compressive loading force thereby to maintain said shell substantially in the mid-region between said walls and to assure that said shell if it includes more than one ring is in the form of a unitized body, as well as to compensate for any change in condition because of said temperature.

11. The combination of claim 10 wherein said compressive loading means comprises
    (a) housing receive over said core at one end,
    (b) a sleeve received over said core at the other end,
    (c) a first element acting between said sleeve and shell,
    (d) a second element acting against shell in the opposite direction, and
    (e) spring means between said second element and said housing for compressively locating said shell in said mid-region.

12. The combination of claim 11 wherein said second element extends from said enclosure and said housing is outside of said enclosure.

13. The combination of claim 11 further including drive means for driving said roll in rotary movement, said drive means including an output pin, and coupling means for coupling said output pin to said sleeve.

* * * * *